(12) United States Patent
Chiu (10) Patent No.: US 6,621,419 B2
(45) Date of Patent: Sep. 16, 2003

(54) SELF-GENERATING LIGHT-PRODUCING SKATEBOARD

(75) Inventor: Cheng-pang Chiu, Taipei (TW)

(73) Assignee: Top Rank Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/097,739

(22) Filed: Mar. 15, 2002

(65) Prior Publication Data

US 2002/0135998 A1 Sep. 26, 2002

(30) Foreign Application Priority Data

Mar. 26, 2001 (TW) ........................ 90204590 U (51) Int. Cl.⁷ ................. G08B 5/00; H02K 44/00; A63C 17/00
(52) U.S. Cl. ............... 340/815.42; 310/67 A; 310/257; 280/11.19; 280/11.203; 340/815.4; 362/551; 362/459
(58) Field of Search ................. 340/815.4, 815.42, 340/815.47, 815.52; 362/495, 500, 464, 103, 551, 459; 310/67 A, 75 C, 257, 49 R, 67 R; 315/78; 280/11.221, 11.203, 11.231, 11.19, 811, 816

(56) References Cited

U.S. PATENT DOCUMENTS 2,505,154 A * 4/1950 Smith ...................... 315/78
4,207,483 A * 6/1980 Baer ...................... 250/231.14
4,387,299 A * 6/1983 Akiyama .................... 280/816
5,536,026 A * 7/1996 Pozzobon et al. ..... 280/11.221
5,580,093 A * 12/1996 Conway ...................... 310/263
5,921,653 A * 7/1999 Chien ........................ 362/103
6,057,627 A * 5/2000 Ragaly ...................... 340/815.4
6,265,984 B1 * 7/2001 Molinaroli .................. 324/163
6,398,395 B1 * 6/2002 Hyun ...................... 340/815.4

* cited by examiner

Primary Examiner—Daniel J. Wu
Assistant Examiner—Anne V. Lai
(74) Attorney, Agent, or Firm—Bacon & Thomas, PLLC (57) ABSTRACT

A self-generating light-producing skateboard mainly includes at least one induction coil assembly mounted on at least one wheel supporter assembly, at least one magnet-containing wheel mounted on the wheel supporter assembly at an outer side of the induction coil assembly, at least one light-emitting element fixed to an outer periphery of a deck of the skateboard and electrically connected to the induction coil assembly, and a light-transferring strip mounted around the outer periphery of the deck. When wheels of the skateboard rotate at high speed, the magnets on the magnet-containing wheel interact with the induction coil assembly to produce current that drives the light-emitting element to emit light. The light-transferring strip transfers the light emitted from the light-emitting element to lighten the outer periphery of the deck, making the skateboard safer for use.

5 Claims, 7 Drawing Sheets

SELF-GENERATING LIGHT-PRODUCING SKATEBOARD

FIELD OF THE INVENTION

The present invention relates to a skateboard, and more particularly to a self-generating light-producing skateboard including at least one induction coil assembly, at least one magnet-containing wheel mounted at an outer side of the induction coil assembly, at least one light-emitting element fixed to the an outer periphery of a deck of the skateboard and electrically connected to the induction coil assembly, and a light-transferring strip mounted around the outer periphery of the deck. The light-transferring strip is provided along an outer surface with spaced frosted, grooved, and ribbed portions to reflect and refract lights emitted from the light-emitting element. The induction coil assembly may also be connected to other electric-energy consuming optional attachments of the skateboard to omit batteries.

BACKGROUND OF THE INVENTION

Most conventional skateboards do not include current and light generating means. It is dangerous to play with skateboards without light-emitting warning means, particularly when playing with them in dark places.

It is therefore desirable to develop a self-generating light-producing skateboard to eliminate drawbacks existing in the conventional skateboards.

SUMMARY OF THE INVENTION

A primary object of the present invention is to provide a self-generating light-producing skateboard that does not need batteries but can automatically produce current to drive light-emitting elements on the skateboard for the same to emit light as a warning to other players.

Another object of the present invention is to provide a self-generating light-producing skateboard that uses a light-transferring strip mounted around an outer periphery of the skateboard to transfer light-emitting from light-emitting elements at separated points to the entire periphery of the skateboard. The light-transferring strip is provided with spaced frosted, grooved, and ribbed portions to reflect and refract light and therefore advantageously reduces the number of light-emitting elements.

A further object of the present invention is to provide a self-generating light-producing skateboard that may include electronic, electric-energy consuming optional attachments to be driven by current automatically generated by the induction coil assembly without using any battery.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Please refer to FIGS. 1 to 5 at the same time in which a self-generating light-producing skate board according to the present invention is shown. For the purpose of simplicity, the self-generating light-producing skateboard of the present invention will be referred to as "the skateboard" hereinafter.

Figure 1:
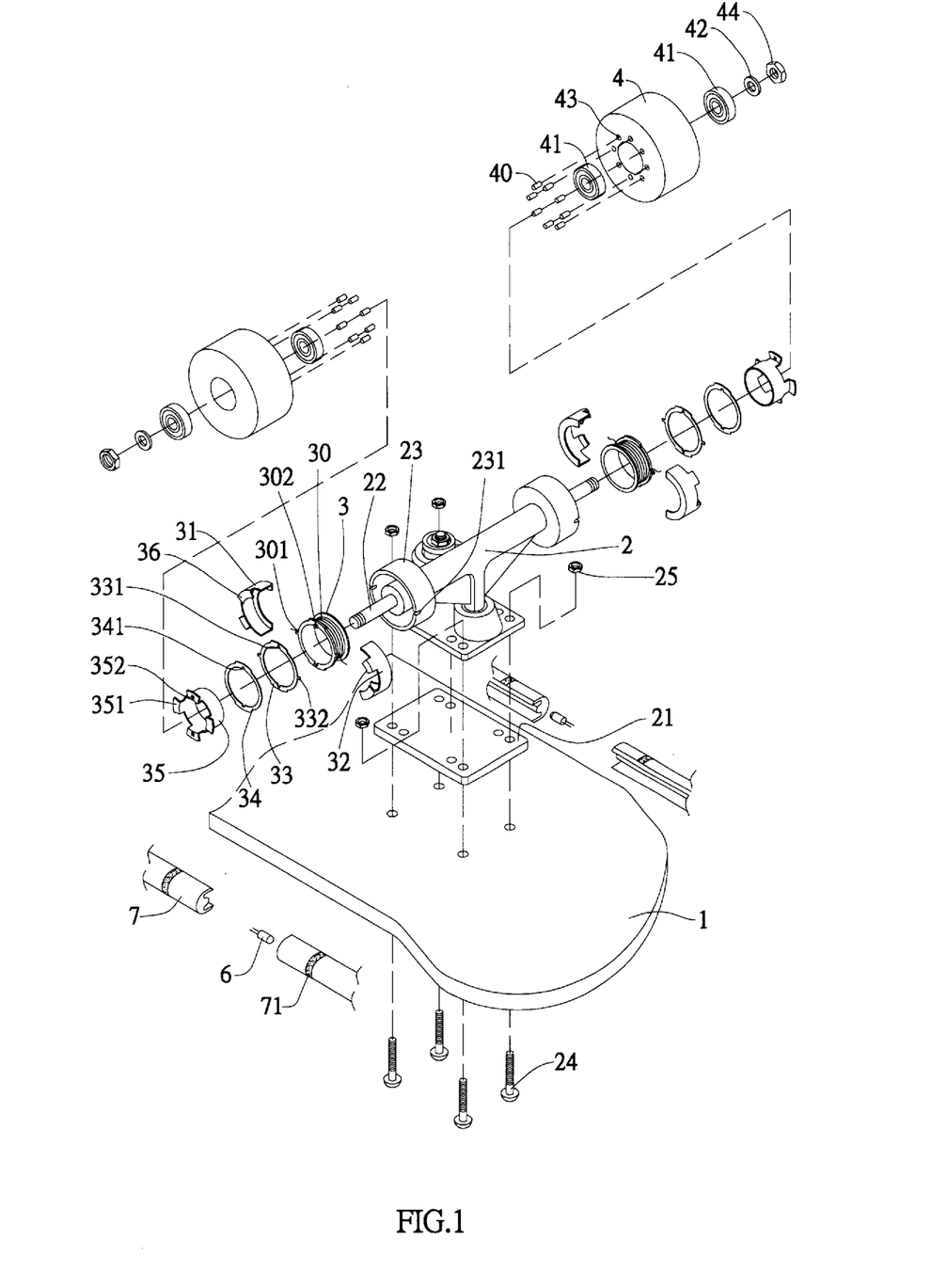
FIG. 1 is a fragmentary, exploded bottom perspective view of a self-generating light-producing skateboard according to the present invention.
Figures 2, 2A:
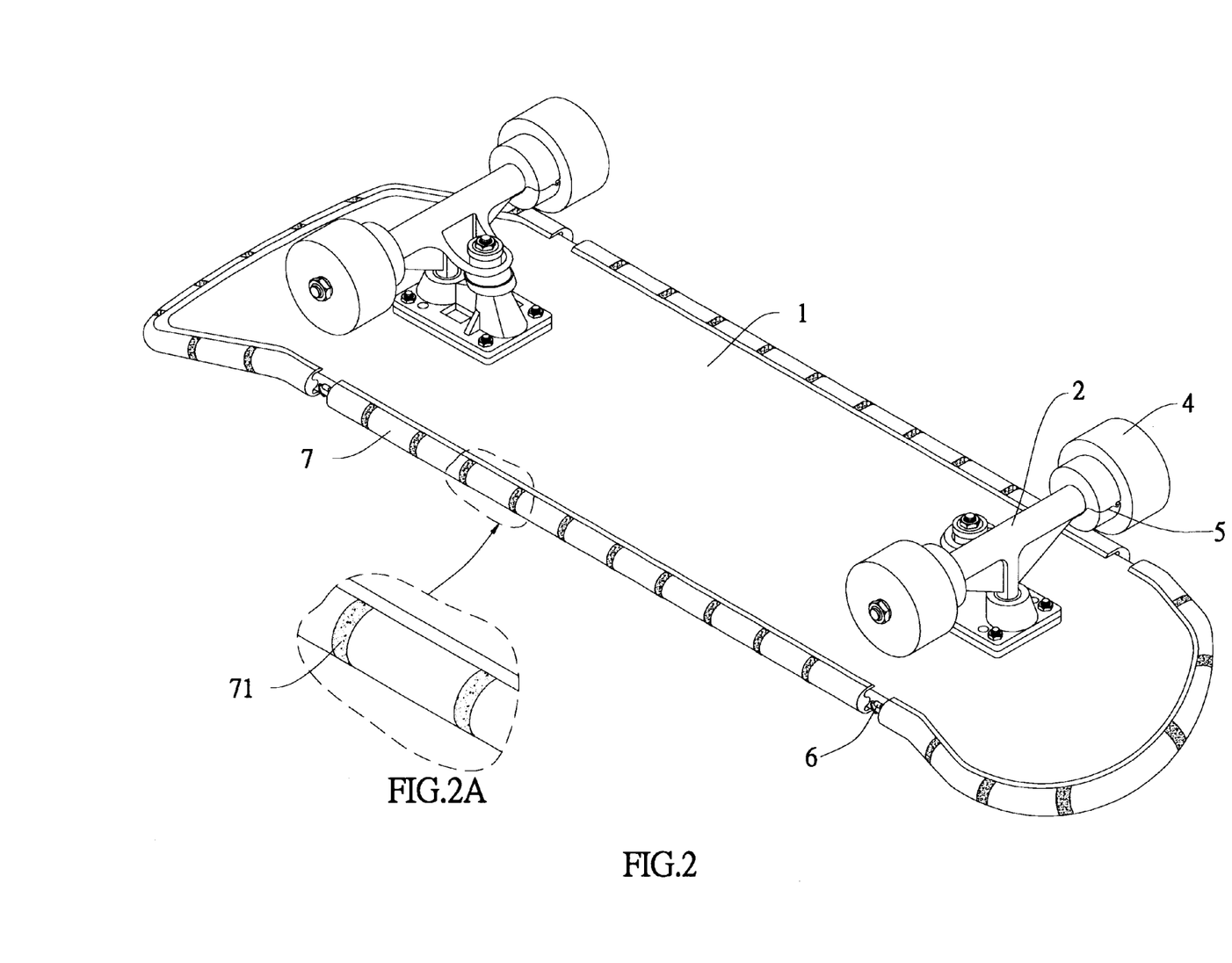
FIG. 2 is an assembled bottom perspective view of FIG. 1.
FIG. 2A is a partially enlarged view of FIG. 2 showing frosted portions provided on a light-transferring strip mounted around the skateboard of FIG. 2.

As shown, the skateboard mainly includes a deck 1, a front and a rear wheel supporter 2 connected to predetermined positions at an underside of the deck 1, at least one induction coil assembly associated with at least one of the two wheel supporters 2, preferably the front one, two wheel assemblies mounted on two ends of each wheel supporter 2, wires 5 extended between the at least one induction coil assembly and at least one light-emitting element 6 that is fixed to a predetermined position on an outer periphery of the deck 1, and a light-transferring strip 7 mounted around the outer periphery of the deck 1.

Each wheel supporter 2 includes an axle 22 extended across a full length of the wheel supporter 2 to fixedly mount thereto, and at least one sideward opened coil chamber 23 fixedly connected to an end of the wheel supporter 2. The coil chamber 23 is provided at predetermined positions with two notches 231. Each wheel supporter 2 together with a base plate 21 form a wheel supporter assembly, which is fixedly connected to an underside of the deck 1 by screws 24 downward extended through the deck 1 and the base plate 21 to engage with nuts 25.

The induction coil assembly includes a sleeve-like inner magnetic pole 35 having a plurality of radially outward extended magnetic pole lugs 351 spaced around an outer end thereof, with one of the magnetic pole lugs 351 provided with a locating hole 352; a ring-shaped insulating washer 34 made of a highly insulating plastic material for putting around an outer periphery of the inner magnetic pole 35 to shield and thereby insulate all the magnetic pole lugs 351 from a copper foil 33 located behind the insulating washer 34, with a locating slot 341 formed on the insulating washer 34 corresponding to the locating hole 352 on the inner magnetic pole 35; the copper foil 33 including two halves that do not contact with each other and having a locating slot 331 corresponding to the locating slot 341 on the insulating washer 34; a sleeve-like coil support 3 having one end connected to the copper foil 33 by means of bonding agent under high temperature; a coil 30 wound around an outer peripheral surface of the coil support 3 with two lead-out wires connected by tin solder to two protrusions 301, 332 provided on the coil support 3 and the copper coil 33, respectively; and left and right halves of outer magnetic poles 31, 32 covered onto an outer peripheral surface of the coil support 3 with a plurality of radially inward extended magnetic pole lugs 36 spaced around outer peripheries of the outer magnetic pole halves 31, 32. The coil support 3 is provided at the contact surface with the copper foil 33 with a locating boss 302 that sequentially extends through the locating slot 331, the locating slot 341, and the locating hole 352 to hold the copper foil 33, the insulating washer 34, and the inner magnetic pole 35 to the coil support 3. When the induction coil assembly is in the above-described assembled state, lugs 36 of the two outer magnetic pole halves 31, 32 and lugs 351 on the inner magnetic pole 35 are staggered in their position. The induction coil assembly is located in one coil chamber 23, preferably the one provided on the front wheel supporter 2, with the axle 22 extended therethrough and the protrusions 301, 332 on the coil support 3 and the copper foil 33, respectively, engaged into notches 231 formed on the coil chamber 23.

Each of the wheel assemblies includes a wheel 4. At least one of the four wheels 4, preferably the one mounted on the front wheel supporter 2 at an outer side of the at least one coil chamber 23 having the at least one induction coil assembly mounted therein, is provided at an inner end surface along an axle hole with a plurality of holes 43 for each receiving a magnet 40 therein. Alternatively, the magnets 40 may be integrally molded with the wheel 4. Two bearings 41 and a washer 42 are sequentially positioned in the axle hole to complete the wheel assembly. The wheel assemblies are then mounted to outer ends of the axles 22 and fixed thereto by screwing a nut 44 to the outer ends of the axles 22. The number of magnets 40 fitted in at least one of the wheels 4 is equal to a total number of the magnetic pole lugs 351 and 36 in the at least one induction coil assembly, and each magnet 40 corresponds to one magnetic pole lug 351 or 36.

The wires 5 are connected at one end by tin-soldering to lead-out wires of the coil 30 tin-soldered to the protrusions 301, 332 on the coil support 3 and the copper foil 33, respectively, and at another end to the at least one light-emitting element 6 fixedly attached to the outer periphery of the deck 1.

Figure 3:
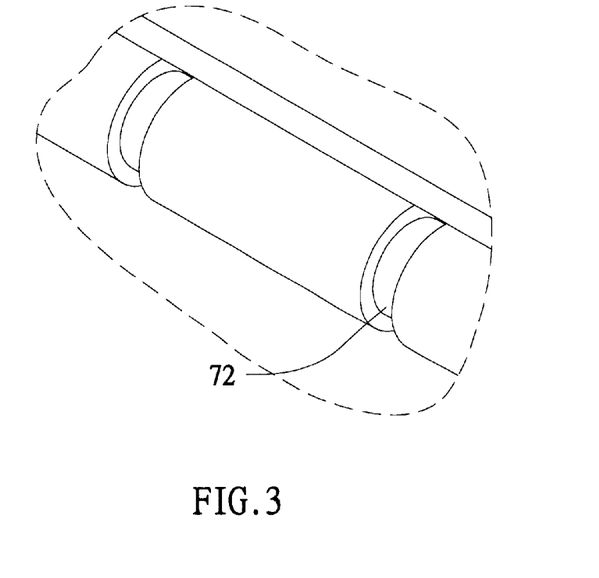
FIG. 3 is a fragmentary and enlarged view showing diameter-reduced groove portions provided on the light-transferring strip around the skateboard of FIG. 2.
Figure 4:
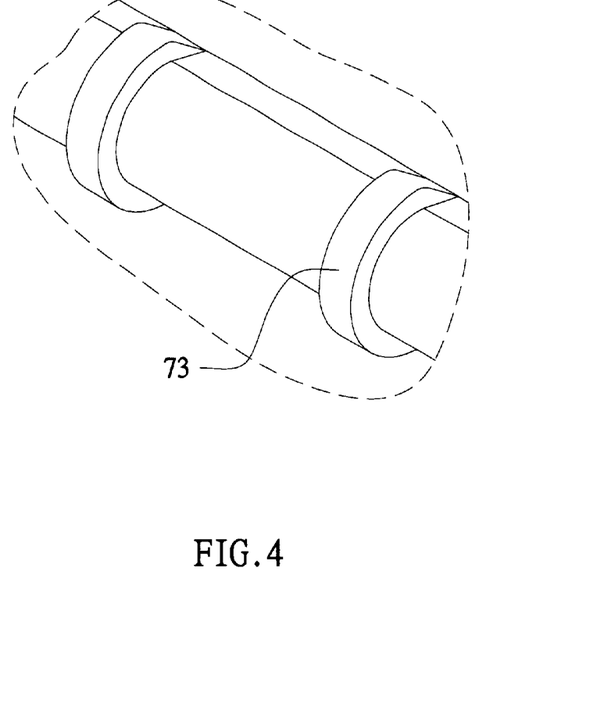
FIG. 4 is a fragmentary and enlarged view showing diameter-increased rib portions provided on the light-transferring strip around the skateboard of FIG. 2.
Figures 5, 5A:
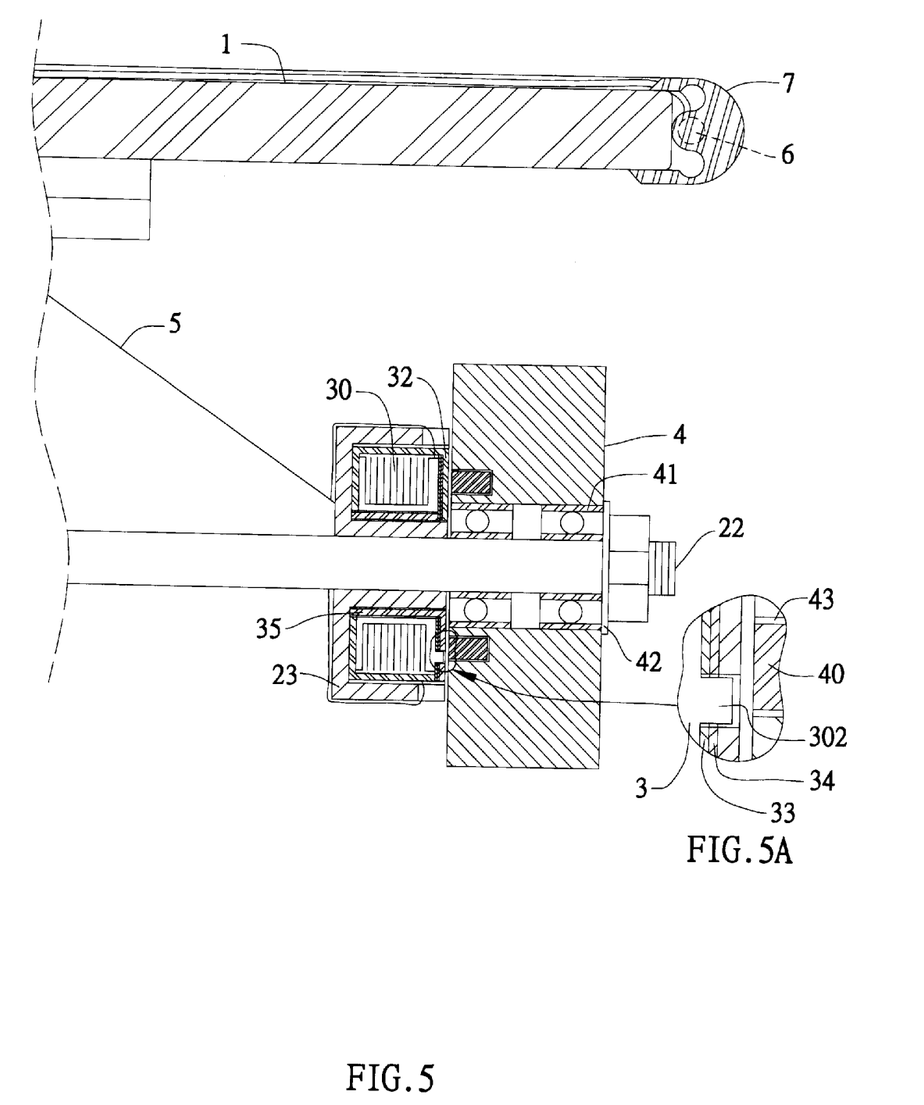
FIG. 5 is a fragmentary and sectioned end view of the skateboard of the present invention.
FIG. 5A is a partially enlarged view of FIG. 5.

The light-transferring strip 7 is attached to a full length of the outer periphery of the deck 1 to protectively cover the light-emitting element 6, and is provided along its outer surface with a plurality of spaced frosted portions 71, diameter-reduced groove portions 72, and diameter-increased rib portions 73 to refract or reflect light at these portions.

Please refer to FIGS. 2 to 5. When the wheels 4 of the skateboard rotate at high speed, the magnets 40 fitted in at least one of the four wheels 4 interact with their corresponding magnetic pole lugs 351, 36 to generate an electromotive force that enables self-generation by the skateboard. Electric energy produced in this manner is transmitted via the wires 5 to the light-emitting element 6 for the latter to emit light. Light emitted from the light-emitting element 6 is then transferred via the light-transferring strip 7 to the full length of the outer periphery of the deck 1. When the light passes through the frosted portions 71, the diameter-reduced groove portions 72, or the diameter-increased rib portions 73 on the light-transferring strip 7, it is reflected and/or refracted as a result of reflection and/or refraction of light passing through interfaces between two different media. This allows light from one single light source at the light-emitting element 6 to produce multiple light spots at different positions and therefore enables reduction in the number of light-emitting elements 6 on the skateboard. However, a user may also elect to provide an additional set of the above-described self-generating light-producing structures at the rear wheel supporter assembly of the skateboard to create an enhanced luminous effect.

The self-generating light-producing skateboard provides good warning effect through lights without the need of any externally provided electric energy, and is therefore safer for use and superior to conventional skateboards.

Figure 6:
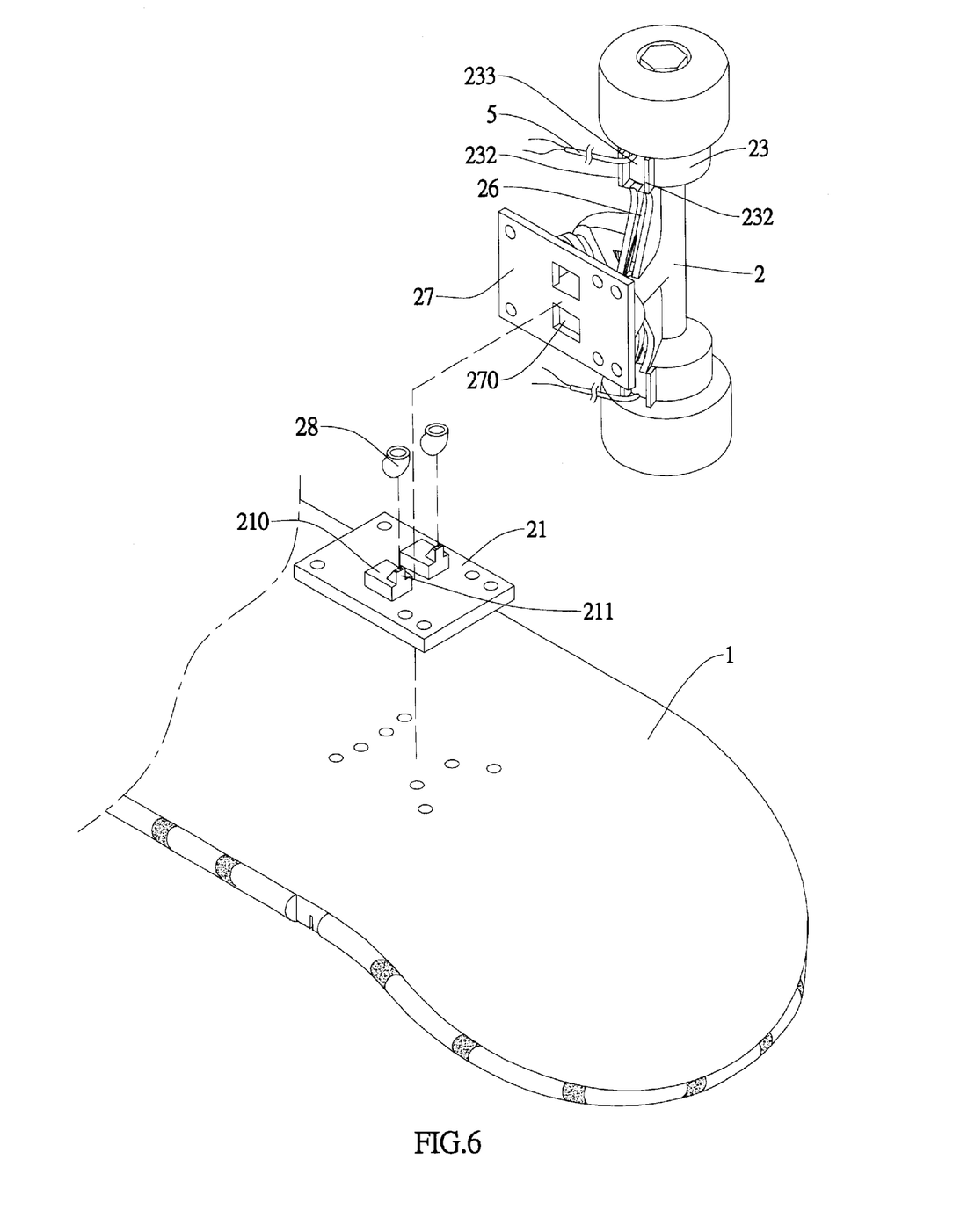
FIG. 6 is a fragmentary, enlarged, and exploded bottom perspective view of the skateboard of the present invention showing the manner of leading wires to a deck of the skateboard via a wheel supporter and a base plate below the deck.
Figures 7, 7A:
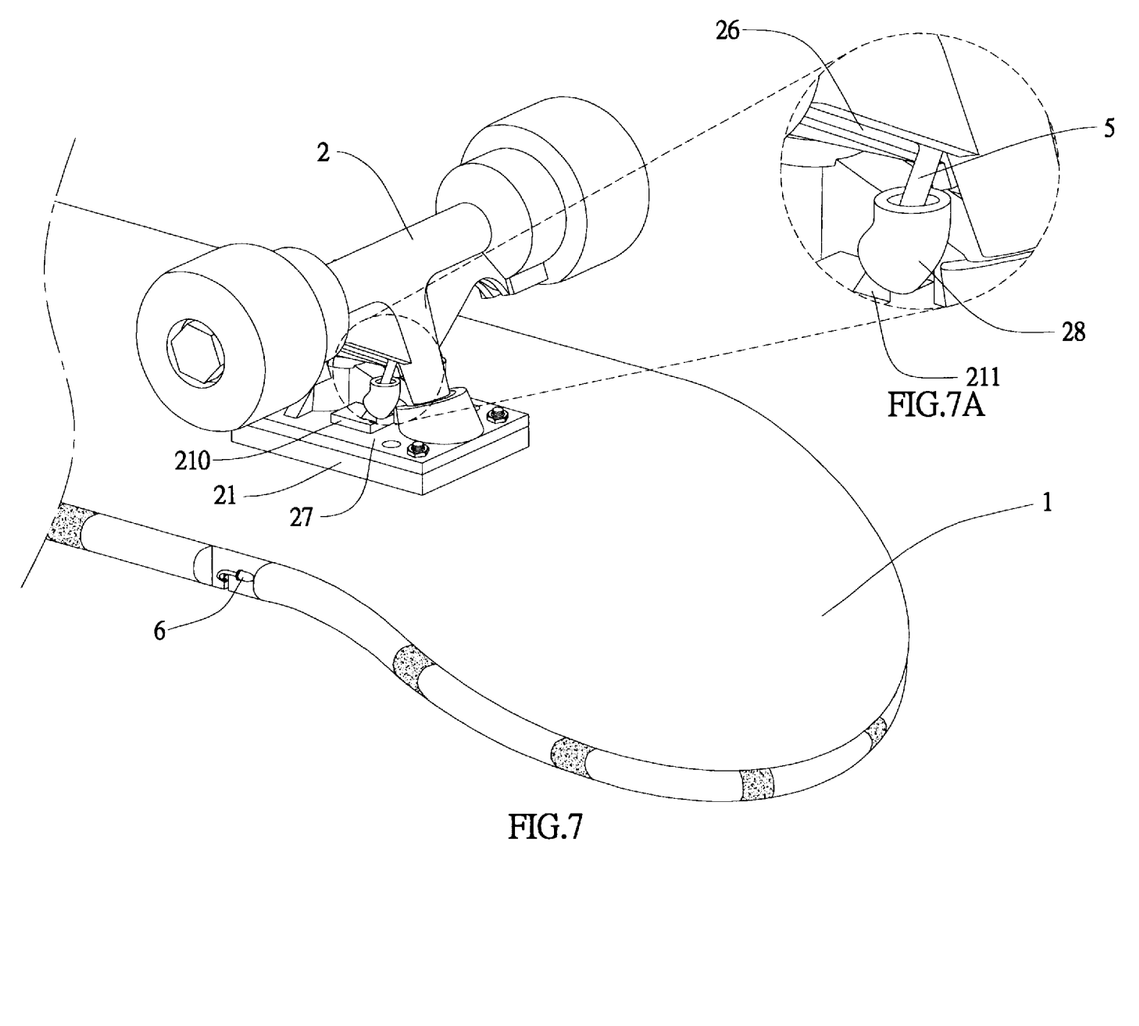
FIG. 7 is an assembled perspective view of FIG. 6.
FIG. 7A is a partially enlarged view of FIG. 7.

Please now refer to FIGS. 6, 7, and 7A in which a preferred manner of laying the wires 5 is shown. The at least one coil chamber 23 having the induction coil assembly mounted therein is provided at its outer peripheral surface with two axially extended stop plates 232 to define a receiving space 233 between them. The wheel supporter 2 corresponding to the coil chamber 23 is also provided with a channel 26 extended from and aligned with each receiving space 233. A mounting plate 27 connected to a bottom of the wheel supporter 2 is formed with openings 270 for engaging with locating blocks 210 projected from the base plate 21. The locating blocks 210 are hollow blocks defining internal spaces communicating with the base plate 21. Each of the locating blocks 210 has a hollow connecting head 211 projected therefrom for a protective sleeve 28 to connect an end thereto. Alternatively, the protective sleeve 28 may be integrally formed on the locating block 210. Another end of the protective sleeve 28 is located immediately below a lower end of the channel 26, so that wires 5 led out of the coil chamber 23 are guided into the channel 26 via the receiving space 233 to pass through corresponding protective sleeve 28 and locating block 210 and finally extend through the base plate 21 to reach at the underside of the deck 1.

Figures 8, 8A, 8B:
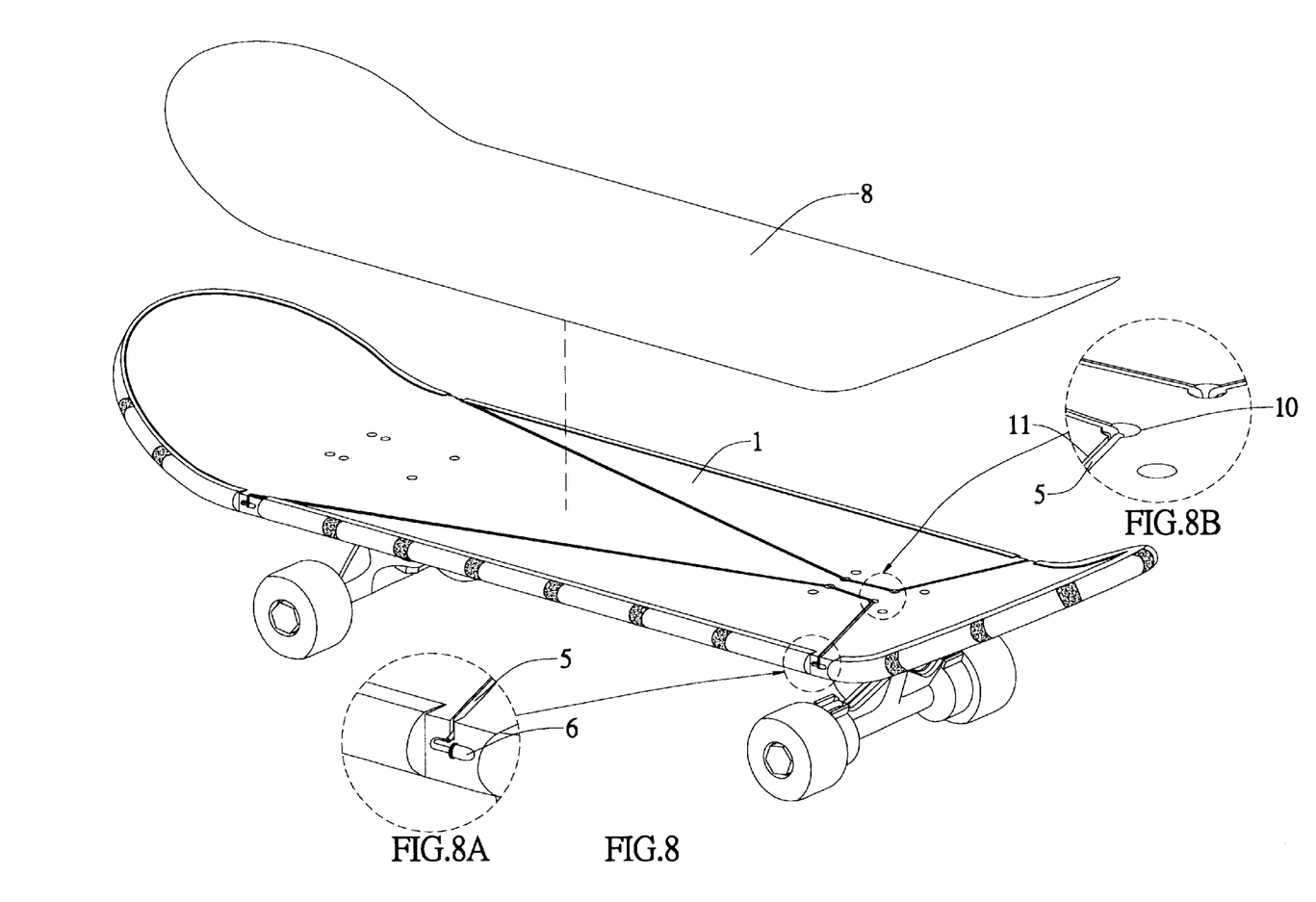
FIG. 8 is a top perspective view of the skateboard of the present invention showing the connection of wires to light-emitting elements provided around the skateboard via wire grooves formed on a top of the deck of the skateboard, and the attachment of an antislip paper to the top of the deck of the skateboard.
FIG. 8A is a partially enlarged view of FIG. 8 showing the connection of wires to the light-emitting element.
FIG. 8B is another partially enlarged view of FIG. 8 showing wires are upward extended through holes provided on the deck of the skateboard before being led to the light-emitting elements.

Please refer to FIGS. 8, 8A and 8B. The wires 5 at the underside of deck 1 are further extended through holes 10 formed on the deck 1 to reach at a top of the deck 1. The wires 5 are then positioned into wire grooves 11 provided on the top of the deck 1 and led to the at least one light-emitting element 6 fixed to the outer periphery of the deck 1. A layer of antislip paper 8 is then attached to the top of the deck 1 to complete the skateboard of the present invention. Since the wires 5 are guided from the coil chamber 23 to pass through the channel 26 and the protective sleeve 28 without being exposed to external environments, they are protected against breaking when the skateboard is vibrated, impacted or frictionally contacted with other articles. As a result, poor connection of the wires 5 to the light-emitting element 6 could be avoided. The antislip paper 8 not only protects the wires 5 in the wire grooves 11 on the top of the deck 1 from contacting with external environments but also give the whole skateboard an integral, beautiful, and active appearance.

It is known that induction coil assembly, magnetic field, and relative motion are three prerequisites of self-generating. Since the induction coil assembly is a fixed structure in the relative motion of the present invention, and since most electronic circuit designs are fixedly provided on such fixed structure, the self-generating means based on the induction coil assembly as disclosed in the present invention may be employed in various kinds of electronic or electric energy consuming optional attachments for the skateboard, such as flash driver, tachometer, odometer, etc., to omit batteries that are otherwise required to power these attachments and thereby simplifies manufacture of the skateboard with such optional attachments.

The present invention has been described with a preferred embodiment thereof and it is understood that many changes and modifications in the described embodiment can be carried out without departing from the scope and the spirit of the invention as defined by the appended claims.

What is claimed is:

1. A self-generating light-producing skateboard, comprising:

a deck;

front and rear wheel sup porter assemblies mounted to predetermined positions at an underside of said deck, each of said wheel supporter assemblies including a wheel supporter, at least one of which is fixedly provided on at least one end with a coil chamber;

at least one induction coil assembly located in said coil chamber with an axle in said wheel supported extended therethrough, each said at least one induction coil assembly including a coil support, left and right outer magnetic pole halves, a copper foil, an insulating washer, and an inner magnetic pole, said axle extending through said inner magnetic pole, said copper foil, and said washer, said coil support extending at least partially around said inner magnetic pole, and said outer magnetic pole halves together extending at least partially around said coil support; a coil being wound around said coil support with two lead-out wires connected to wires that are then connected to at least one light-emitting element fixedly connected to an outer periphery of said deck;

four wheel assemblies separately mounted to two ends of said two wheel supporters of said front and said rear wheel supporter assemblies, each said wheel assembly including a wheel rotatably mounted to an outer en of said axle; at least one of said wheels that is mounted to an outer side of said at least one coil chamber being provided at an inner end surface along an axle hole with a plurality of holes for each receiving a magnet therein; and a light-transferring strip mounted around an outer periphery of said deck;

whereby when said wheel rotate at high speed, said magnets set at the inner end surface of said at least one wheel interact with said at least one induction coil assembly to generate current that drives said at least one light-emitting element to emit light, and said light in transferred via said light-transferring strip to light the outer periphery of said deck, enabling said skateboard to produce light without batteries and be safer for use.

2. The self-generating light-producing skateboard as claimed in claim 1, wherein said inner magnetic pole of said at least one induction coil assembly has a plurality of magnetic pole lugs spaced along an outer end thereof, one of said magnetic pole lugs being provided with a locating hole corresponding to locating slots provided on said insulating washer and said copper foil of said induction coil assembly, such that said inner magnetic pole, said insulating washer, and said copper foil are held to said coil support by a boss on said coil support extended through said locating hole and said locating slots.

3. The self-generating light-producing skateboard as claimed in claim 1, wherein said light-transferring strip is provided along an outer surface with a plurality of spaced frosted portions, diameter-reduced groove portions, and diameter-increased rib portions to reflect or refract light emitted from said at least one light-emitting element and transferred via said light-transferring strip, so that light from a single light source of said at least one light-emitting element produces multiple light spots on said skateboard.

4. The self-generating light-producing skateboard as claimed in claim 1, wherein said induction coil assembly is adapted to connect to various kinds of electronic, electric energy consuming optional attachments of said skateboard to enable functioning of said optional attachments without batteries and simplified manufacture of said skateboard.

5. The self-generating light-producing skateboard as claimed in claim 1, wherein said optional attachments of said skateboard are selected from the group consisting of a flash driver, tachometer, and odometer.

* * * * *